US010292047B1

(12) United States Patent
Jiang et al.

(10) Patent No.: US 10,292,047 B1
(45) Date of Patent: May 14, 2019

(54) SYSTEMS AND METHODS FOR PREVENTING TRACKING OF MOBILE DEVICES

(71) Applicant: Symantec Corporation, Mountain View, CA (US)

(72) Inventors: Kevin Jiang, Wiltham, MA (US); Michael Shavell, Merrimack, NH (US); Matt Boucher, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 178 days.

(21) Appl. No.: 14/862,181

(22) Filed: Sep. 23, 2015

(51) Int. Cl.
  *G06F 7/04* (2006.01)
  *G06F 17/30* (2006.01)
  *H04N 7/16* (2011.01)
  *H04W 12/02* (2009.01)
  *H04W 8/26* (2009.01)

(52) U.S. Cl.
  CPC ............. *H04W 12/02* (2013.01); *H04W 8/26* (2013.01)

(58) Field of Classification Search
  None
  See application file for complete search history.

(56) References Cited

U.S. PATENT DOCUMENTS

| | | | | |
|---|---|---|---|---|
| 7,158,777 B2* | 1/2007 | Lee | .......................... | H04L 63/08 455/410 |
| 8,126,145 B1* | 2/2012 | Tewari | .................. | H04L 9/0841 370/401 |
| 8,201,233 B2* | 6/2012 | Beaulieu | ................ | H04L 9/0844 341/67 |
| 8,897,447 B1* | 11/2014 | Rohrweck | ............. | H04W 12/08 380/270 |
| 9,843,579 B2* | 12/2017 | Zou | ...................... | H04L 63/0869 |
| 2004/0166897 A1* | 8/2004 | Hamada | .................. | H04L 12/66 455/560 |

(Continued)

FOREIGN PATENT DOCUMENTS

WO   WO 2014168320 A1 * 10/2014 ......... H04L 61/6004

OTHER PUBLICATIONS

"Wigle", https://wigle.net/, as accessed Sep. 2, 2015, (Oct. 22, 1999).

(Continued)

*Primary Examiner* — Lynn D Feild
*Assistant Examiner* — Vadim Savenkov
(74) *Attorney, Agent, or Firm* — FisherBroyles, LLP

(57) ABSTRACT

A computer-implemented method for preventing tracking of mobile devices may include (1) identifying, from a first device with wireless networking capability, an initial service set identifier used by the first device as identification for a wireless network, where a second device with wireless networking capability also uses the initial service set identifier, (2) determining, based at least in part on a time indicator at the first device, that the initial service set identifier is to be changed, (3) generating a new service set identifier for use by the first device instead of the initial service set identifier, where the new service set identifier is generated with an identifier generation algorithm that is also used by the second device, and (4) replacing use of the initial service set identifier by the first device with use of the new service set identifier. Various other methods, systems, and computer-readable media are also disclosed.

18 Claims, 8 Drawing Sheets

(56) References Cited

U.S. PATENT DOCUMENTS

| | | | | |
|---|---|---|---|---|
| 2004/0179690 A1* | 9/2004 | Soliman | ................... | H04L 9/12 |
| | | | | 380/277 |
| 2005/0152305 A1* | 7/2005 | Ji | ........................... | H04L 45/54 |
| | | | | 370/328 |
| 2006/0240802 A1* | 10/2006 | Venkitaraman | ....... | H04W 12/04 |
| | | | | 455/411 |
| 2009/0274065 A1* | 11/2009 | Jin | ....................... | H04W 12/04 |
| | | | | 370/254 |
| 2014/0053241 A1* | 2/2014 | Norrman | ................ | H04L 63/08 |
| | | | | 726/3 |
| 2014/0215585 A1* | 7/2014 | Sanaullah | ........... | H04L 63/0281 |
| | | | | 726/6 |
| 2014/0337950 A1* | 11/2014 | Yang | .................... | H04W 12/08 |
| | | | | 726/7 |
| 2014/0362835 A1* | 12/2014 | Pallen | .................. | H04W 12/04 |
| | | | | 370/338 |
| 2016/0150008 A1* | 5/2016 | Shemar | .............. | H04W 56/001 |
| | | | | 709/248 |
| 2016/0299725 A1* | 10/2016 | Hosoda | ................ | H04W 12/08 |
| 2017/0034215 A1* | 2/2017 | Sigel | .................... | H04L 63/107 |

OTHER PUBLICATIONS

Beal, Vangie, "SSID—service set identifier", http://www.webopedia.com/TERM/S/SSID.html, as accessed Sep. 2, 2015, (Aug. 6, 2002).

Kevin Jiang, et al.; Systems and Methods for Selecting Identifiers for Wireless Access Points; U.S. Appl. No. 14/868,329, filed Sep. 28, 2015.

* cited by examiner

SYSTEMS AND METHODS FOR PREVENTING TRACKING OF MOBILE DEVICES

BACKGROUND

As personal mobile devices with wireless communications capabilities proliferate, so do privacy concerns. An increasing number of devices in the human environment detect other devices via wireless communications and record, catalog, and/or report information capable of uniquely identifying devices along with the locations where devices have been observed. For example, some databases in existence map the locations of hundreds of millions of wireless networks (e.g., that have been observed over time by various devices) as named by their service set identifiers ("SSIDs").

Client devices may periodically transmit an SSID of a remembered network when searching for a suitable wireless network connection. These transmissions may also be observed, recorded, cataloged, and/or reported by unrelated third-party devices. Thus, a party may individuate and track the movement of a mobile device owner by the SSID transmitted by the mobile device. Furthermore, the subsequent ability to match the SSIDs transmitted by mobile devices in the field with SSIDs previously observed at the locations of corresponding wireless networks (e.g., the mobile device owner's home or place of work) may allow a party to not only track the movements of a mobile device owner, but to ascertain where the mobile device owner works or lives—potentially revealing the identity of the mobile device owner.

Thus, in order to frustrate the attempts by third parties to track the movements of individuals without consent, the instant disclosure identifies and addresses a need for additional and improved systems and methods for preventing tracking of mobile devices.

SUMMARY

As will be described in greater detail below, the instant disclosure generally relates to systems and methods for preventing tracking of mobile devices by periodically changing the service set identifiers used by wireless networking devices (e.g., both client devices and access points together) to keep the service set identifiers used by the wireless networking devices in synchronization with each other.

In one example, a computer-implemented method for preventing tracking of mobile devices may include (1) identifying, from a first device with wireless networking capability, an initial service set identifier used by the first device as identification for a wireless network, where a second device with wireless networking capability also uses the initial service set identifier as identification for the wireless network, thereby facilitating wireless networking involving the first device and the second device, (2) determining, based at least in part on a time indicator at the first device, that the initial service set identifier is to be changed, (3) generating, responsive to determining that the initial service set identifier is to be changed, a new service set identifier for use by the first device instead of the initial service set identifier, where the new service set identifier is generated with an identifier generation algorithm that is also used by the second device, such that both the first device and the second device generate the same new service set identifier, and (4) replacing use of the initial service set identifier by the first device with use of the new service set identifier, such that both the first device and the second device use the new service set identifier, thereby continuing to facilitate wireless networking involving the first device and the second device while frustrating potential tracking attempts relying on the initial service set identifier.

In one embodiment, the first device includes a wireless access point and the second device includes a mobile device that connects to the wireless network via the wireless access point.

In one embodiment, the wireless access point transmits a probe response advertising the new service set identifier, based on the new service set identifier corresponding to the wireless network.

In one embodiment, the wireless access point also uses a consistent service set identifier to facilitate a third device connecting to the wireless network, the wireless access point using the consistent service set identifier concurrently with the initial service set identifier when the initial service set identifier is in use and concurrently with the new service set identifier when the new service set identifier is in use.

In one embodiment, the wireless access point accepts both the initial service set identifier and the new service set identifier as corresponding to the wireless network for a predetermined period of time before accepting the new service set identifier and rejecting the initial service set identifier.

In one embodiment, the first device includes a mobile device that connects to the wireless network via a wireless access point and the second device includes the wireless access point.

In one embodiment, the mobile device transmits a probe request that specifies the new service set identifier in an attempt to discover the wireless network, based on the new service set identifier corresponding to the wireless network.

In one embodiment, the mobile device monitors the wireless access point for a point in time when the wireless access point transmits the new service set identifier instead of the initial service set identifier and adjusts the time indicator at the first device to align with the point in time such that the first device and the second device synchronize service set identifier changes.

In one embodiment, the mobile device replaces use of the initial service set identifier with use of the new service set identifier by altering a remembered service set identifier for automatically connecting to the wireless network to the new service set identifier.

In one embodiment, the identifier generation algorithm, on both the first device and the second device, uses the time indicator as input for deterministically generating the new service set identifier.

In one embodiment, the identifier generation algorithm, on both the first device and the second device, uses a shared secret as input for deterministically generating the new service set identifier.

In one embodiment, a system for implementing the above-described method may include (1) an identification module, stored in memory, that identifies, from a first device with wireless networking capability, an initial service set identifier used by the first device as identification for a wireless network, where a second device with wireless networking capability also uses the initial service set identifier as identification for the wireless network, thereby facilitating wireless networking involving the first device and the second device, (2) a determination module, stored in memory, that determines, based at least in part on a time indicator at the first device, that the initial service set identifier is to be changed, (3) a generation module, stored in memory, that generates, responsive to determining that the initial service set identifier is to be changed, a new service set identifier for use by the first device instead of the initial service set identifier, where the new service set identifier is generated with an identifier generation algorithm that is also used by the second device, such that both the first device and the second device generate the same new service set identifier, (4) a replacement module, stored in memory, that replaces use of the initial service set identifier by the first device with use of the new service set identifier, such that both the first device and the second device use the new service set identifier, thereby continuing to facilitate wireless networking involving the first device and the second device while frustrating potential tracking attempts relying on the initial service set identifier, and (5) at least one physical processor configured to execute the identification module, the determination module, the generation module, and the replacement module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, from a first device with wireless networking capability, an initial service set identifier used by the first device as identification for a wireless network, where a second device with wireless networking capability also uses the initial service set identifier as identification for the wireless network, thereby facilitating wireless networking involving the first device and the second device, (2) determine, based at least in part on a time indicator at the first device, that the initial service set identifier is to be changed, (3) generate, responsive to determining that the initial service set identifier is to be changed, a new service set identifier for use by the first device instead of the initial service set identifier, where the new service set identifier is generated with an identifier generation algorithm that is also used by the second device, such that both the first device and the second device generate the same new service set identifier, and (4) replace use of the initial service set identifier by the first device with use of the new service set identifier, such that both the first device and the second device use the new service set identifier, thereby continuing to facilitate wireless networking involving the first device and the second device while frustrating potential tracking attempts relying on the initial service set identifier.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
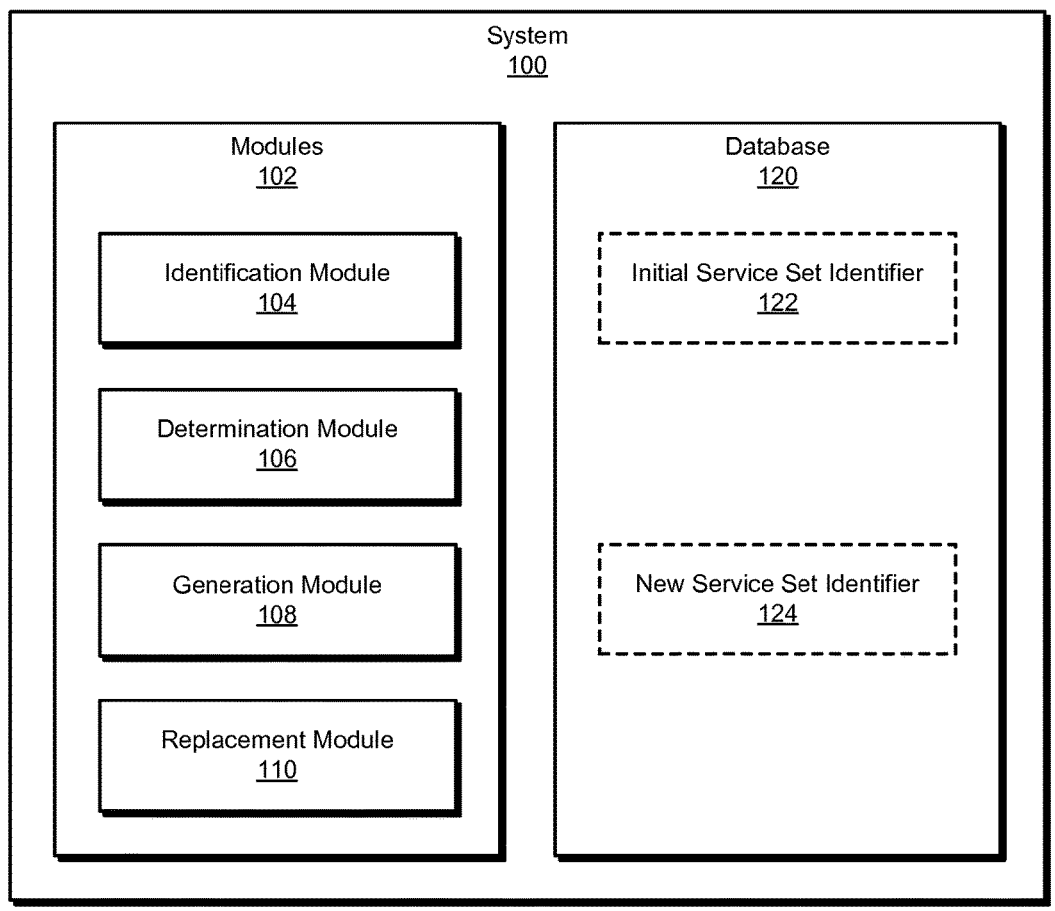
FIG. 1 is a block diagram of an exemplary system for preventing tracking of mobile devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing tracking of mobile devices. As will be explained in greater detail below, by periodically changing the service set identifiers used by wireless networking devices (e.g., both client devices and access points together) to keep the service set identifiers used by the wireless networking devices in synchronization with each other, the systems and methods described herein may allow mobile devices to access known wireless networks without transmitting publicly observable information that can be used to personally identify and/or track the users of the mobile devices.

The following will provide, with reference to FIGS. 1-2 and 4-6, detailed descriptions of exemplary systems for preventing tracking of mobile devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for preventing tracking of mobile devices. As illustrated in this figure, exemplary system 100 may include one or more modules 102 for performing one or more tasks. For example, and as will be explained in greater detail below, exemplary system 100 may include an identification module 104 that identifies, from a first device with wireless networking capability, an initial service set identifier used by the first device as identification for a wireless network, where a second device with wireless networking capability also uses the initial service set identifier as identification for the wireless network, thereby facilitating wireless networking involving the first device and the second device. Exemplary system 100 may additionally include a determination module 106 that determines, based at least in part on a time indicator at the first device, that the initial service set identifier is to be changed. Exemplary system 100 may also include a generation module 108 that generates, responsive to determining that the initial service set identifier is to be changed, a new service set identifier for use by the first device instead of the initial service set identifier, where the new service set identifier is generated with an identifier generation algorithm that is also used by the second device, such that both the first device and the second device generate the same new service set identifier. Exemplary system 100 may additionally include a replacement module 110 that replaces use of the initial service set identifier by the first device with use of the new service set identifier, such that both the first device and the second device use the new service set identifier, thereby continuing to facilitate wireless networking involving the first device and the second device while frustrating potential tracking attempts relying on the initial service set identifier.

Replacement module 110 may further replace use of the initial service set identifier by the first device with use of the new service set identifier, such that both the first device and the second device use the new service set identifier, thereby continuing to facilitate wireless networking involving the first device and the second device while frustrating potential tracking attempts relying on the initial service set identifier. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing device 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more service set identifiers, such as an initial service set identifier 122 and a new service set identifier 124.

Database 120 may represent portions of a single database or computing device or a plurality of databases or computing devices. For example, database 120 may represent a portion of computing device 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as computing device 206 in FIG. 2, computing system 710 in FIG. 7, and/or portions of exemplary network architecture 800 in FIG. 8.

Figure 2:
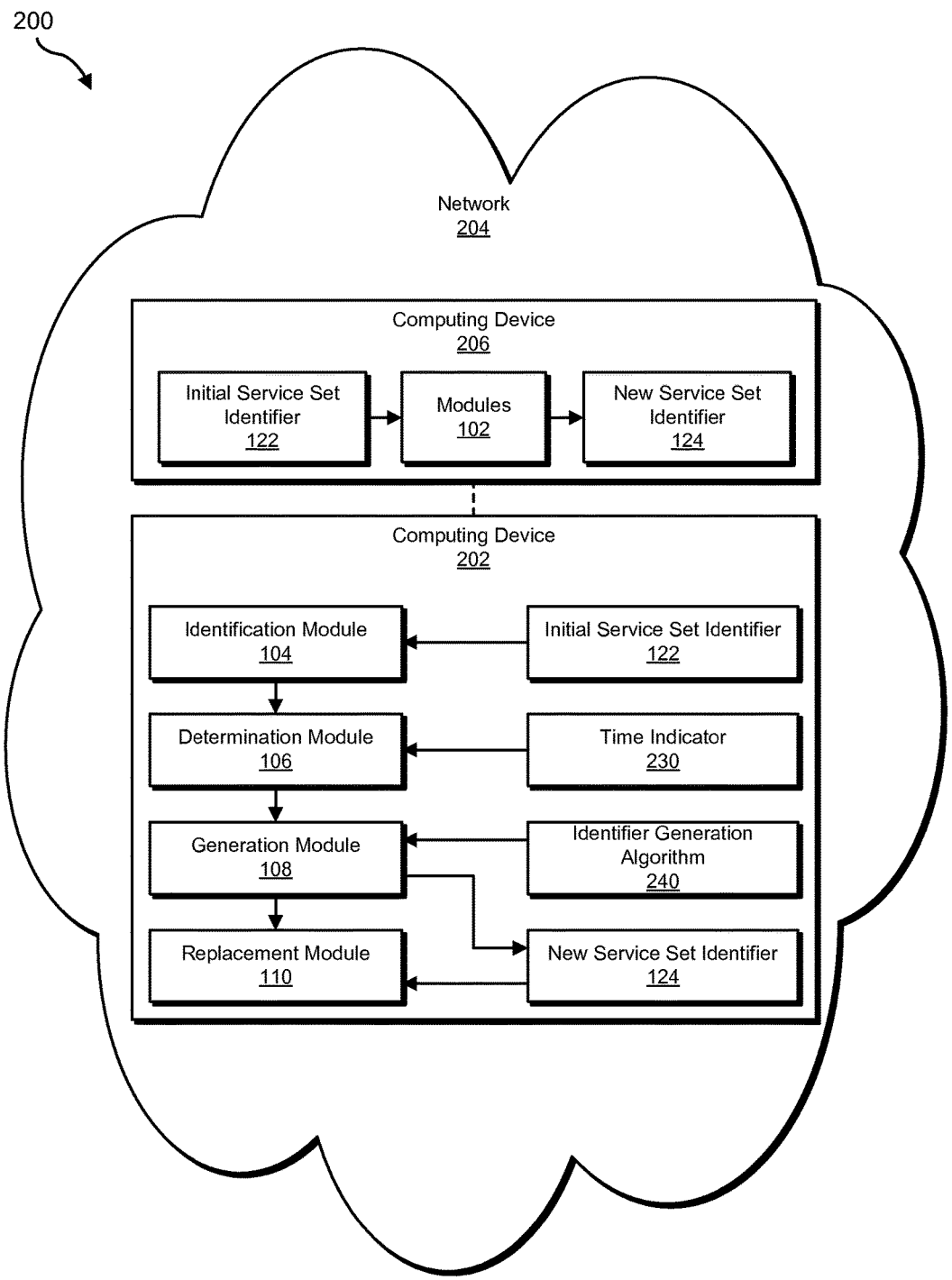
FIG. 2 is a block diagram of an additional exemplary system for preventing tracking of mobile devices.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing device 206 (e.g., as part of and/or to provide access to a network 204). In one example, computing device 202 may be programmed with one or more of modules 102 and/or may store all or a portion of the data in database 120. Additionally or alternatively, computing device 206 may be programmed with one or more of modules 102 and/or may store all or a portion of the data in database 120.

In one embodiment, one or more of modules 102 from FIG. 1 may, when executed by at least one processor of computing device 202 and/or computing device 206, enable computing device 202 and/or computing device 206 to preventing tracking of mobile devices. For example, and as will be described in greater detail below, one or more of modules 102 may cause computing device 202 and/or computing device 206 to preventing tracking of mobile devices. For example, and as will be described in greater detail below, identification module 104 may identify, from computing device 202 with wireless networking capability, initial service set identifier 122 used by computing device 202 as identification for a wireless network (e.g., network 204), where computing device 206 with wireless networking capability also uses initial service set identifier 122 as identification for the wireless network, thereby facilitating wireless networking involving computing device 202 and computing device 206. Determination module 106 may determine, based at least in part on a time indicator 230 at computing device 202, that initial service set identifier 122 is to be changed. Generation module 108 may generate, responsive to determining that initial service set identifier 122 is to be changed, new service set identifier 124 for use by computing device 202 instead of initial service set identifier 122, where new service set identifier 124 is generated with an identifier generation algorithm 240 that is also used by computing device 206, such that both computing device 202 and computing device 206 generate the same new service set identifier 124. Replacement module 110 may replace use of initial service set identifier 122 by computing device 202 with use of new service set identifier 124, such that both computing device 202 and computing device 206 use new service set identifier 124, thereby continuing to facilitate wireless networking involving computing device 202 and computing device 206 while frustrating potential tracking attempts (e.g., of computing device 202 and/or computing device 206) relying on initial service set identifier 122.

Computing device 202 generally represents any type or form of computing device capable of reading computer-executable instructions. Examples of computing device 202 include, without limitation, laptops, tablets, networking devices, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device. In some examples, computing device 202 may represent a client computing device (e.g., a mobile computing device) capable of connecting to a wireless network. In some examples, computing device 202 may represent a wireless access point that facilitates connections to a wireless network.

Computing device 206 generally represents any type or form of computing device that is capable of reading computer-executable instructions. Examples of computing device 206 include, without limitation, laptops, tablets, networking devices, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device. In some examples, computing device 206 may represent a client computing device (e.g., a mobile computing device) capable of connecting to a wireless network. In some examples, computing device 206 may represent a wireless access point that facilitates connections to a wireless network.

Network 204 generally represents any medium or architecture capable of facilitating communication or data transfer. Examples of network 204 include, without limitation, an intranet, a Local Area Network (LAN), a Personal Area Network (PAN), exemplary network architecture 800 in FIG. 8, or the like. Network 204 may facilitate communication or data transfer using wireless connections. In one embodiment, network 204 may facilitate communication between computing device 202 and computing device 206, be partly constituted by communication between computing device 202 and computing device 206, and/or be accessed by computing device 202 and/or computing device 206 via computing device 206 and/or computing device 202.

Figure 3:
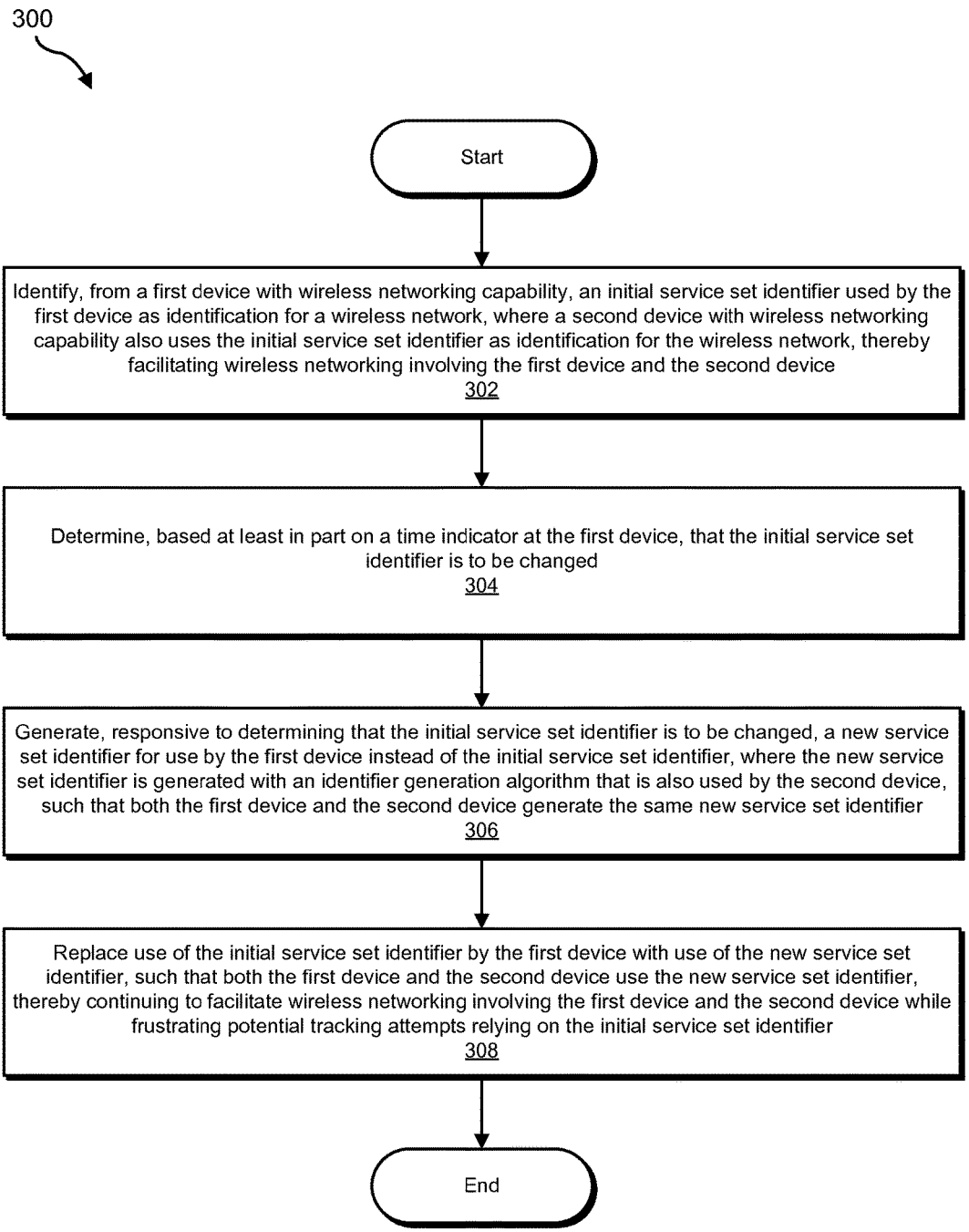
FIG. 3 is a flow diagram of an exemplary method for preventing tracking of mobile devices.

FIG. 3 is a flow diagram of an exemplary computer-implemented method 300 for preventing tracking of mobile devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, one or more of the systems described herein may identify, from the first device with wireless networking capability, an initial service set identifier used by the first device as identification for a wireless network, where a second device with wireless networking capability also uses the initial service set identifier as identification for the wireless network, thereby facilitating wireless networking involving computing device 202 and the second device. For example, identification module 104 may, as part of computing device 202 in FIG. 2, identify, from computing device 202 with wireless networking capability, initial service set identifier 122 used by computing device 202 as identification for a wireless network 204, where computing device 206 with wireless networking capability also uses initial service set identifier 122 as identification for the wireless network 204, thereby facilitating wireless networking involving computing device 202 and computing device 206.

As used herein, the term "wireless network," as used herein, generally represents any medium or architecture capable of facilitating wireless communication or wireless data transfer. In some examples, a wireless network may facilitate communication or data transfer between two or more computing devices. In some examples, the term "wireless network" may refer to a service set and/or a medium and/or architecture that provides communication between two or more devices within the service set. In some examples, a service set may include a basic service set (e.g., an access point with one or more associated stations). Additionally or alternatively, a service set may include an extended service set (e.g., two or more interconnected basic service sets that may function as a single logical service set). In some examples, the wireless network may include a wireless local area network (WLAN). Additionally or alternatively, the wireless network may include a network implemented according to IEEE 802.11 specifications. In some examples, the wireless network may include an ad-hoc network. Additionally or alternatively, the wireless network may include a mesh network. In some examples, a wireless network and/or a service set of a wireless network may be identified by a service set identifier.

As used herein, the term "service set identifier" may refer to any identifier used to identify a service set. For example, one or more devices within a service set may use a service set identifier to identify the service set and/or a wireless network connecting the service set. Additionally or alternatively, one or more devices providing wireless network infrastructure for the service set may use the service set identifier to identify the service set. In some examples, a wireless client may transmit a service set identifier in search of a response from a device that facilitates wireless networking for the service set. Additionally or alternatively, a wireless client may receive a broadcast from a device that facilitates wireless networking for the service set advertising the service set identifier. For example, an access point may broadcast the service set identifier to inform wireless clients of an opportunity to join the service set and/or connect to a wireless network. In some examples, the service set identifier may include a basic service set identifier (BSSID). Additionally or alternatively, the service set identifier may include an extended service set identifier (ESSID). In some examples, the service set identifier may include a character string (e.g., of alphanumeric characters). Additionally or alternatively, the service set identifier may include a series of octets. In some examples, a client device may remember one or more service set identifiers of wireless networks that are known by, trusted by, and/or have been successfully connected to by the client device. In this manner, the client device may periodically send probe requests using one or more remembered service set identifiers in search of a known, trusted, and/or useable wireless network.

The first device and second devices may include any type of device with wireless networking capability. For example, the first device may include a wireless access point and the second device may include a mobile device that connects to the wireless network via the wireless access point. In another example, the first device may include a mobile device that connects to the wireless network via a wireless access point and the second device may include the wireless access point. In these examples, the wireless access point may provide devices (such as the mobile device) with access to the wireless network based at least in part on the service set identifier used by the wireless access point and the connecting devices to identify the wireless network. In some examples, the first device and the second device may include devices configured to form an ad-hoc wireless network and/or a wireless mesh network.

Identification module 104 may identify the initial service set identifier in any suitable manner. For example, identification module 104 may identify the initial service set identifier within a list of one or more remembered service set identifiers (e.g., which a user of the first device may select to connect to a corresponding wireless network and/or which the first device may use to automatically connect to a corresponding wireless network when available). In some examples, identification module 104 may identify the initial service set identifier as a service set identifier to be routinely changed (e.g., to prevent tracking of the first device by monitoring service set identifiers transmitted by the first device).

Figure 4:
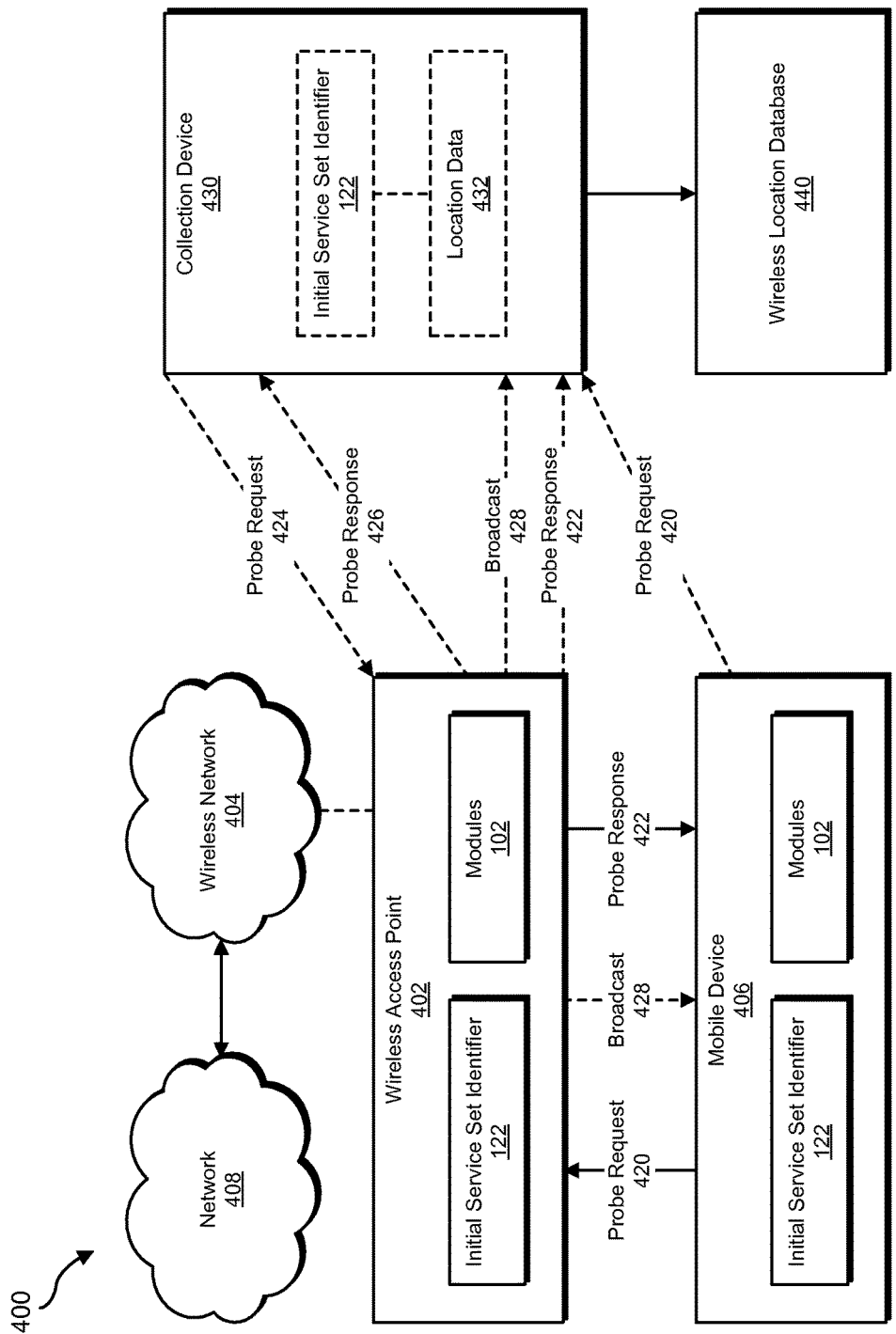
FIG. 4 is a block diagram of an exemplary computing system for preventing tracking of mobile devices.

As an example of the context in which one or more of the systems described herein may perform one or more of the steps described herein, FIG. 4 illustrates an exemplary system 400 for preventing tracking of mobile devices. As shown in FIG. 4, exemplary system 400 may include a wireless access point that provides a mobile device 406 access to a wireless network 404 (which may, in turn, provide mobile device 406 access to a network 408, e.g., the Internet). Both wireless access point 402 and mobile device 406 may identify wireless network 404 with initial service set identifier 112. Thus, for example, mobile device 406 may wirelessly transmit a probe request 420, including initial service set identifier 112. Wireless access point 402 may receive probe request 420 and recognize initial service set identifier 112. Wireless access point 402 may then transmit a probe response 422 (which may also include initial service set identifier 112). Mobile device 406 may receive probe response 422, informing mobile device 406 that wireless access point 402 can provide a connection to wireless network 404. In addition or as an alternative, wireless access point 402 may transmit a broadcast 428 including initial service set identifier 122, thereby informing mobile device 406 that wireless access point 402 can provide a connection to wireless network 404.

In one example, wireless access point 402 may be installed at a fixed location (e.g., the home of the user of mobile device 406). Additionally or alternatively, wireless access point 402 may be installed at the workplace of the user of mobile device 406 and/or at a location previously visited by the user of the mobile.

As shown in FIG. 4, a collection device 430 may observe one or more transmissions from wireless access point 402 and/or mobile device 406. Collection device 430 may include any of a variety of devices and operate in any of a variety of contexts. For example, collection device 430 may include a device configured to collect information about observed wireless networks (e.g., a wardriving device). In some examples, collection device 430 may include a mobile computing device that runs a background process to send system information to a central server (e.g., a smartphone that reports, among other items, observed wireless networks). In one example, collection device 430 may represent a primarily stationary device that is installed in the vicinity of wireless access point 402 (e.g., a computing device owned by a neighbor of the owner of mobile device 406). In some examples, collection device 430 may travel past wireless access point 402 and one or more additional wireless access points, collecting and/or reporting service set identifiers observed in its vicinity.

Collection device 430 may collect initial service set identifier 112 in any of a number of ways. For example, collection device 430 may periodically transmit probe requests to elicit responses from wireless access points. When collection device 430 is near wireless access point 402, collection device 430 may transmit a generic probe request (e.g., without specifying a service set identifier) and receive a probe response 426 including initial service set identifier 122. Additionally or alternatively, wireless access point 402 may periodically broadcast initial service set identifier 122. Collection device 430 may therefore receive broadcast 428 (including initial service set identifier 122) when in proximity to wireless access point 402. In some examples, wireless access point 402 may observe probe request 420 initiated by mobile device 406 and/or probe response 422 provided by wireless access point 402 when in proximity to wireless access point 402 (and thereby observe initial service set identifier 122). In some examples, after observing a transmission of initial service set identifier 122 (e.g., by one of the above methods), collection device 430 may associate initial service set 122 with the location where collection device 430 observed initial service set 122 (e.g., recorded as location data 432). Additionally or alternatively, collection device 430 may transmit initial service set identifier 122 and/or location data 432 to wireless location database 440. As will be explained in greater detail below, the systems and methods described herein may interfere with uses of systems such as wireless location database 440 to identify and/or track users of mobile devices (such as mobile device 406).

Returning to FIG. 3, at step 304, one or more of the systems described herein may determine, based at least in part on a time indicator at the first device, that the initial service set identifier is to be changed. For example, determination module 106 may, as part of computing device 202 in FIG. 2, determine, based at least in part on time indicator 230 at computing device 202, that initial service set identifier 122 is to be changed.

As used herein, the term "time indicator" may refer to any indicator of time and/or that may be useful for keeping the actions of two devices that are out of communication with each other in sync. For example, the term "time indicator" may refer to an implementation of the Network Time Protocol (NTP) and/or data derived from an NTP implementation. Additionally or alternatively, the term "time indicator" may refer to an internal clock and/or data derived from an internal clock. In some examples, the term "time indicator" may refer to a radio clock and/or data derived from a radio clock. Additionally or alternatively, the term "time indicator" may refer to data derived from time signals (e.g., from Global Positioning System devices). In some examples, the time indicator of the first device and the time indicator of the second device may start in synchronization (e.g., indicate action for starting at the same time and with the same periodicity).

Determination module 106 may determine that the initial service set identifier is to be changed in any suitable manner. For example, determination module 106 may identify a reference time and a periodicity, and determine that the initial service set identifier is to be changed in alignment with the periodicity as offset from the reference time. For example, determination module 106 may determine that the initial service set identifier is to be changed every hour on the hour. In some examples, determination module 106 may use a non-periodic but deterministic function (e.g., that determines changes at intervals that are irregular but which are consistent across implementations of the function).

In some examples, clock drift may cause the clocks of two devices initially in synchronization to fall out of synchronization. However, as will be explained below, some of the systems and/or methods described herein may rely on the ability of two devices to act in synchronization. Thus, in some examples, the systems and methods described herein may compensate for drift or other synchronization errors. For example, a mobile device may be set to change its use of a service set identifier at the same time that a wireless access point changes its use of the service set identifier. Thus, the mobile device may monitor the wireless access point for a service set identifier change and adjust its own time indicator to stay in synchronization with the action of the wireless access point (e.g., for the present change and/or for future changes). For example, the mobile device may (1) monitor the wireless access point for a point in time when the wireless access point transmits a new service set identifier instead of the initial service set identifier and (2) adjusts the time indicator at the first device to align with the point in time such that the first device and the second device synchronize service set identifier changes. The mobile device may adjust the time indicator in any suitable manner. For example, the mobile device may adjust its internal clock. In another example, the mobile device may record a delta between what was indicated by the internal clock and was observed from the wireless access point. The mobile device may then use the delta to correct for the presumed clock drift between the two devices in the future by modifying its internal clock time by the delta to generate the time indicator.

Figure 5:
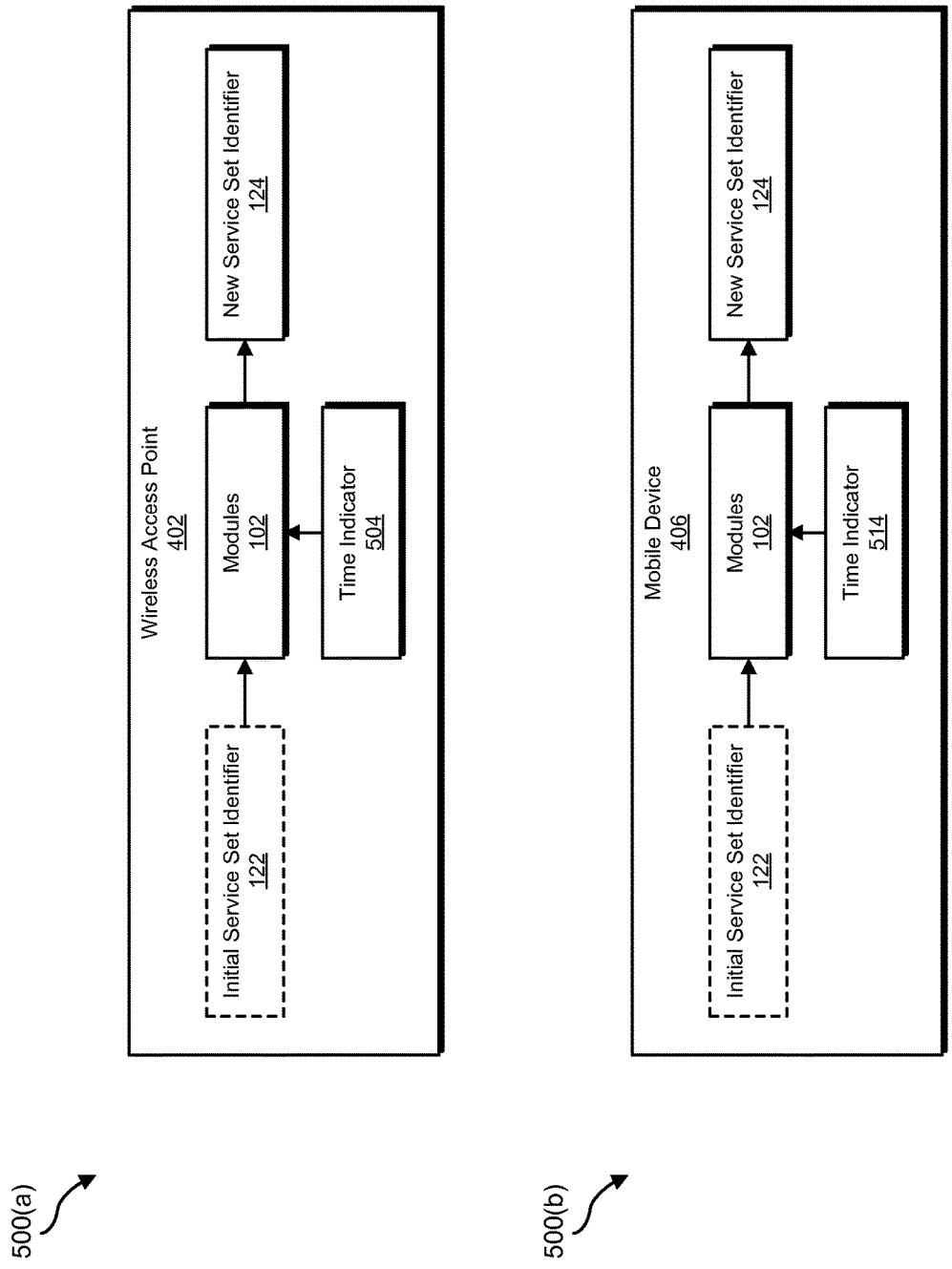
FIG. 5 is a block diagram of an exemplary computing system for preventing tracking of mobile devices.

To provide an example of synchronization across devices in service set identifier changes, FIG. 5 illustrates wireless access point 402 at a location 500(a) and mobile device 406 at a location 500(b). While mobile device 406 may have previously been in proximity to wireless access point 402, locations 500(a) and 500(b) may place wireless access point 402 and mobile device 406 out of range of communication with each other. However, wireless access point 402 and mobile device 406 may have previously been synchronized and/or configured with a schedule for changing service set identifiers. Accordingly, even though wireless access point 402 and mobile device 406 may be apart, determination module 106 on wireless access point 402 may determine, based on time indicator 504, that initial service set identifier 122 is to be changed at the same time that determination module 106 on mobile device 406 determines, based on time indicator 514, that initial service set identifier 122 is to be changed.

Returning to FIG. 3, at step 306, one or more of the systems described herein may generate, responsive to determining that the initial service set identifier is to be changed, a new service set identifier for use by the first device instead of the initial service set identifier, where the new service set identifier is generated with an identifier generation algorithm that is also used by the second device, such that both the first device and the second device generate the same new service set identifier. For example, generation module 108 may, as part of computing device 202 in FIG. 2, generate, responsive to determining that initial service set identifier 122 is to be changed, new service set identifier 124 for use by computing device 202 instead of initial service set identifier 122, where new service set identifier 124 is generated with identifier generation algorithm 240 that is also used by computing device 206, such that both computing device 202 and computing device 206 generate the same new service set identifier 124.

As used herein, the term "identifier generation algorithm" may refer to any deterministic algorithm, function, module, and/or formula for producing a service set identifier. In some examples, the identifier generation algorithm may generate pseudorandom data (e.g., data that exhibits statistical randomness but which is fully determinable from the inputs to the identifier generation algorithm). The first and second devices may be configured with the same identifier generation algorithm (i.e., functionally equivalent algorithms). In addition, in some examples the identifier generation algorithm may take various parameters as inputs, and the first and second devices may be configured with the same parameters for the identifier generation algorithm.

Generation module 108 may generate the new service set identifier with the identifier generation algorithm in any suitable manner. For example, the identifier generation algorithm may, on both the first device and the second device, use the time indicator as input (e.g., provided by instances of generation module 108 on the respective devices) for deterministically generating the new service set identifier. Additionally or alternatively, generation module 108 may use data derived from the time indicator as input (e.g., an incrementor that increments each time determination module 106 determines, based on the time indicator, that the service set identifier is to be changed). As explained above, because the time indicator at the first device may be synchronized with a time indicator at the second device, the identifier generation algorithm may produce the same output on each device.

In some examples, generation module 108 may the identifier generation algorithm, on both the first device and the second device, uses a shared secret as input (e.g., provided by instances of generation module 108 on the respective devices) for deterministically generating the new service set identifier. In some examples, the shared secret may have previously been established when the first device and second device were in communication about the wireless network. In this manner, the identifier generation algorithm may produce the same output on each device.

In some examples, the identifier generation algorithm may generate service set identifiers that resemble typical service set identifiers and/or human-generated service set identifiers. In this manner, a mobile device may be difficult to track based on the format and/or other uncommon characteristics of the service set identifiers that it uses. For example, the identifier generation algorithm may generate word- and/or phrase-based service set identifiers.

Returning to FIG. 3, at step 308, one or more of the systems described herein may replace use of the initial service set identifier by the first device with use of the new service set identifier, such that both the first device and the second device use the new service set identifier, thereby continuing to facilitate wireless networking involving computing device 202 and the second device while frustrating potential tracking attempts relying on the initial service set identifier. For example, replacement module 110 may, as part of computing device 202 in FIG. 2, replace use of initial service set identifier 122 by computing device 202 with use of new service set identifier 124, such that both computing device 202 and computing device 206 use new service set identifier 124, thereby continuing to facilitate wireless networking involving computing device 202 and computing device 206 while frustrating potential tracking attempts relying on initial service set identifier 122.

Replacement module 110 may replace use of the initial service set identifier by the first device with use of the new service set identifier in any suitable manner. For example, replacement module 110 may replace one or more instances of the initial service set identifier in volatile and/or non-volatile memory of the first device with the new service set identifier. Additionally or alternatively, replacement module 110 may clone a wireless network profile corresponding to the initial service set identifier, modify the cloned profile to indicate the new service set identifier, and then delete the initial profile that corresponds to the initial service set identifier. In some examples, the first device (e.g., in the case that the first device functions a wireless access point) may transmit a probe response advertising the new service set identifier based on the new service set identifier now corresponding to the wireless network. Additionally or alternatively, the first device may broadcast the new service set identifier to advertise the wireless network.

In some examples, the first device may retain, accept, and/or use both the initial service set identifier and the new service set identifier for a predetermined window of time before and/or after the determined time of the change to the new service set identifier. For example, as explained above, in some examples the first and second devices may drift out of synchronization. In these cases, allowing for the use of either the initial or the new service set identifier during the time window may allow the first and second devices to communicate effectively about the wireless network using either the initial or the new service set identifier, even if one device has determined to change to using the new service set identifier and the other device has yet to determine to change to using the new service set identifier. For example, a wireless access point may accept both the initial service set identifier and the new service set identifier as corresponding to the wireless network for a predetermined period of time before accepting the new service set identifier and rejecting the initial service set identifier. Additionally or alternatively, a mobile device may retain the initial service set identifier for a predetermined period of time after adding the new service set identifier to a list of remembered networks.

In some examples (e.g., where the first device includes a wireless access point), the first device may also use a consistent service set identifier to facilitate a third device connecting to the wireless network. Thus, the wireless access point may use the consistent service set identifier concurrently with the initial service set identifier when the initial service set identifier is in use and concurrently with the new service set identifier when the new service set identifier is in use. In this manner, the wireless access point may maintain compatibility with devices that are not configured to intermittently change service set identifiers. For example, a wireless access point may be configured with a consistent service set identifier and a changing service set identifier. Devices that do not support the use of a changing service set identifier and/or devices that are primarily stationary (e.g., printers, home appliances, home media devices, etc.) may use the consistent service set identifier to access the wireless network, while devices that support the use of a changing service set identifier and/or devices that are primarily mobile (e.g., smartphones, wearable computing devices, etc.) may be configured with the systems and methods described herein to use the changing service set identifier.

Other examples of replacement module 110 replacing use of the initial service set identifier by the first device with use of the new service set identifier may apply to a variety of devices, including mobile devices and/or client devices. In some examples, the first device may transmit a probe request that specifies the new service set identifier in an attempt to discover the wireless network, based on the new service set identifier corresponding to the wireless network. In one examples, a mobile device may replace use of the initial service set identifier with use of the new service set identifier by altering a remembered service set identifier for automatically connecting to the wireless network to the new service set identifier.

By changing service set identifiers in synchronization, the first and second devices may continue to function together as before to provide wireless communication together. In addition, the above-described change to the service set identifier used for the wireless network may frustrate attempts to track and/identify a mobile device and/or a user of a mobile device. For example, as explained earlier with reference to FIG. 4, one or more collection devices may collect and correlate service set identifiers with locations. In addition, such collection devices may contribute to wireless location databases. Subsequent observations of a service set identifier by a tracking device in the field may be checked against such databases, potentially allowing a tracker to identify the presence and personal information of individuals carrying mobile devices. Additionally or alternatively, a newly observed service set identifier may be tracked from location to location, such that the movements of a user of a mobile device may be trackable even if these movements are not tied to personal information (such as the location of the user's home and associated personal information).

Figure 6:
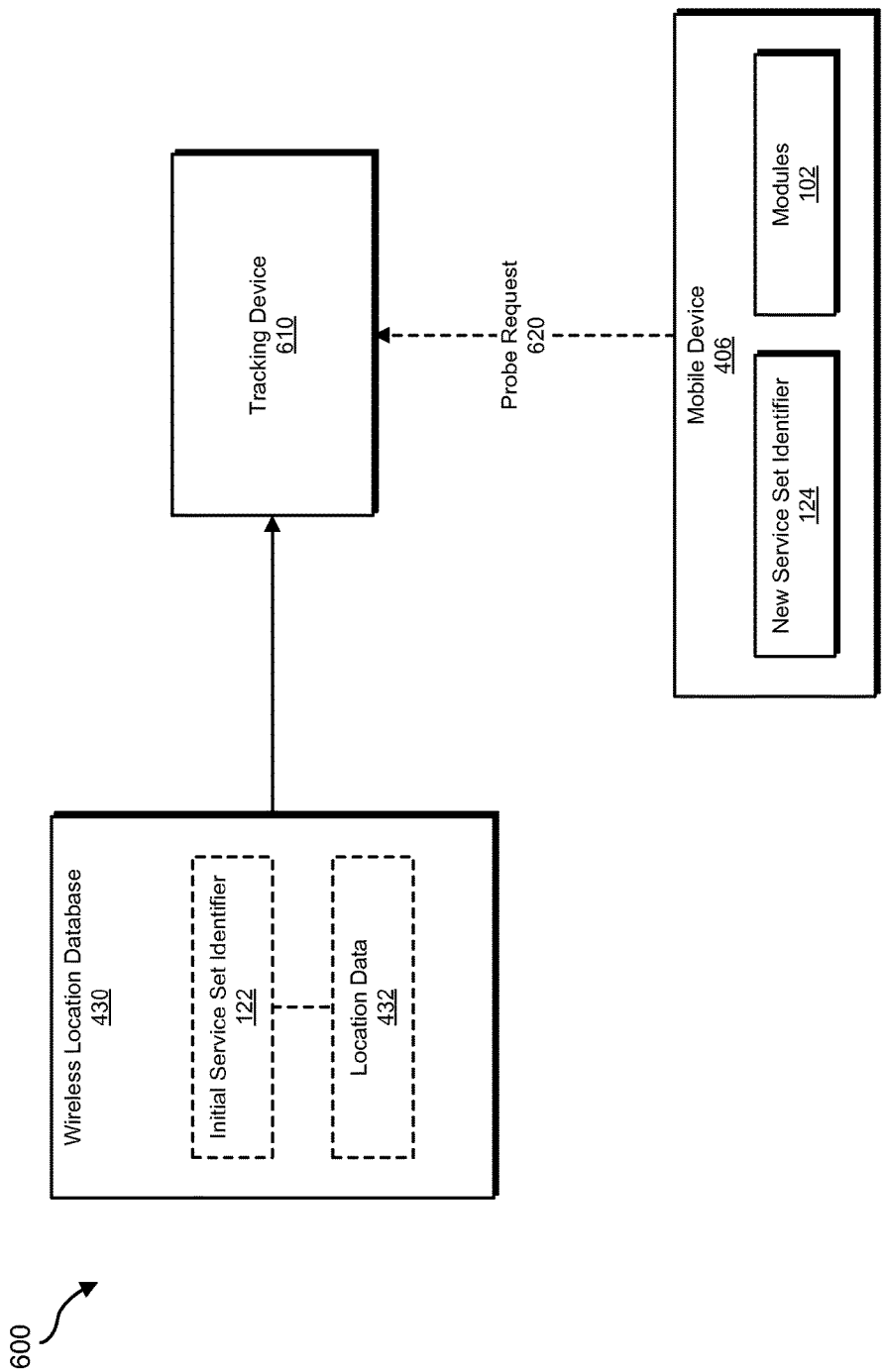
FIG. 6 is a block diagram of an exemplary computing system for preventing tracking of mobile devices.

To provide an example of frustrating tracking attempts, FIG. 5 illustrates wireless access point 402 and mobile device 406 independently generating new service set identifier 124 and replacing the use of initial service set identifier 122 with the use of new service set identifier 124. FIG. 6 illustrates a system 600 for preventing tracking of mobile devices in a scenario where a tracking attempt is frustrated. As shown in FIG. 6, wireless location database 430 has stored an association between initial service set identifier 122 and location data 432. A tracking device 610 with access to wireless location database 430 observes a probe request 620 by mobile device 406. Probe request 620 may include new service set identifier 124 (e.g., representing an attempt by mobile device 406 to determine whether wireless network 404 depicted in FIG. 4 is in range). Tracking device 610 may extract new service set identifier 124 and consult with wireless location database 430 (e.g., query wireless location database 430 with new service set identifier 124 and/or submit new service set identifier 124 along with current location information to wireless location database 430). However, tracking device 610 will not successfully associate new service set identifier 124 with location data 432, as new service set identifier 124 differs from initial service set identifier 122.

As discussed above, two devices with wireless networking capabilities may change service set identifiers in synchronization. In some examples, additional devices that recognize the same wireless network may also change service set identifiers according to the same algorithm and the same schedule. Accordingly, more than two devices (e.g., all devices within a service set) may use the systems and methods described herein, thereby enabling an arbitrary number of devices that may access a wireless network via a given wireless access point to maintain privacy while also maintaining access to the wireless network.

In some examples, mobile devices may further frustrate tracking attempts by spoofing a media access control (MAC) address of the device when transmitting a probe request. For example, a mobile device by generate a random MAC address to include in each probe request.

As explained above in connection with method 300 in FIG. 3, one or more systems and methods may prevent tracking via wireless network probing operations that include SSIDs by dynamically changing SSIDs on a periodic interval on both the client and the access point. By changing the SSID deterministically, both the client and the access point can stay in synchronization. In some examples, the client and the access point may use an algorithm equivalent to a time-based one-time-password algorithm. In one example, both the client and the access point would have (1) a shared secret and (2) the current timestamp truncated to the minute, the hour, or any desired granularity to match the frequency of the SSID change. The shared secret and truncated timestamp may be provided as input to a one-way function that outputs a pseudo-random SSID. By changing the SSID often enough, these systems and methods may make attempts to track using the SSID difficult. To mitigate clock drift, the access point may accept a window of SSIDs, and the client may re-synchronize its clock by observing SSID broadcasts by the access point. To remain backward compatible with devices that do not support dynamically changing SSIDs, the access point may provide two separate SSIDs: a dynamic SSID and a static SSID. Home devices that are not at risk of being tracked (e.g., printers, media devices, etc.) may use the static SSID.

These systems and methods may address privacy issues caused by SSIDs without resorting to steps such as disabling SSID probing (which may be impractical and/or impossible for some devices and may be inconvenient for users) or choosing common SSIDs that could cause conflicts with proximate devices (e.g., from neighbors and/or passers-by) due to a name collision.

Figure 7:
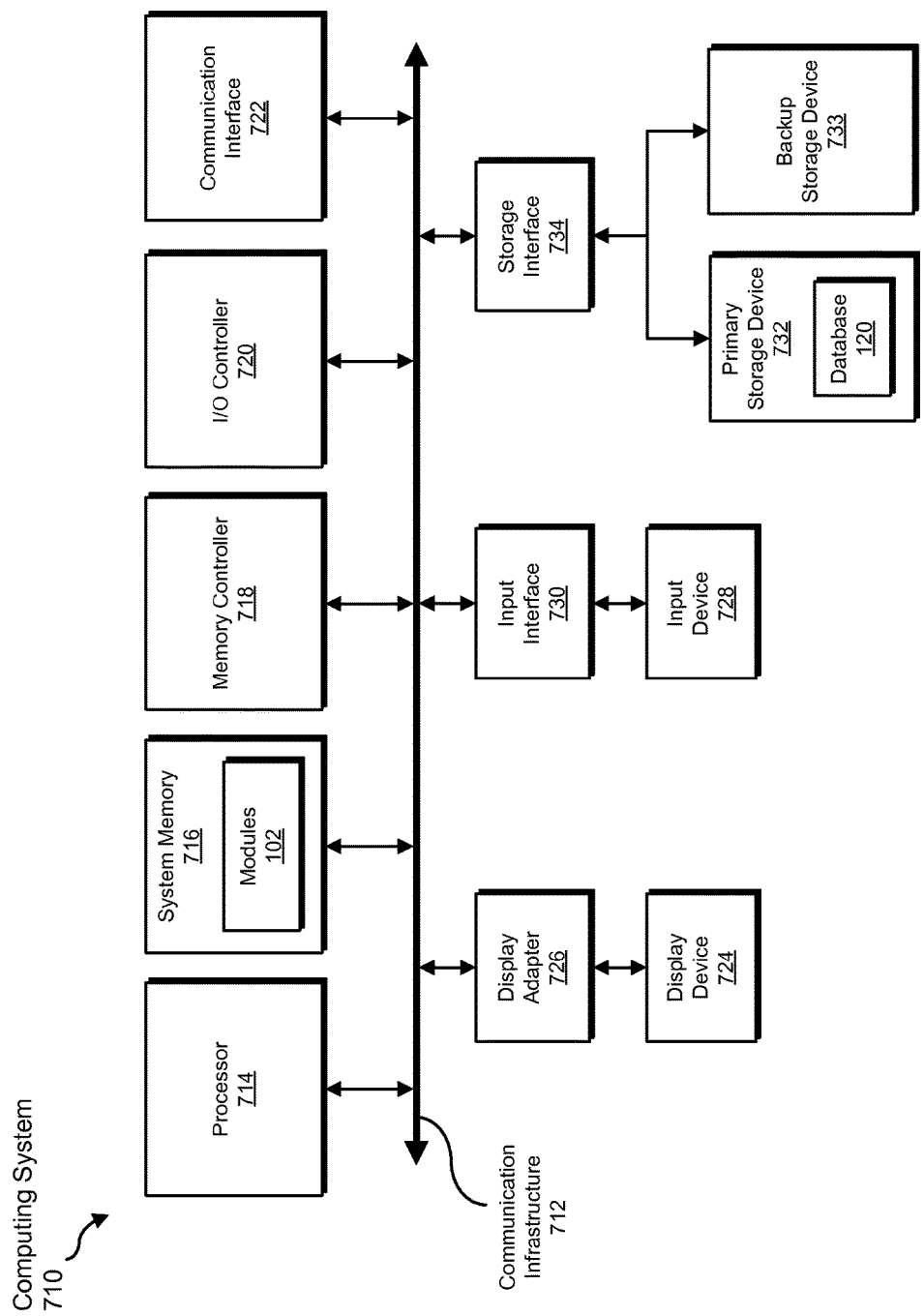
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
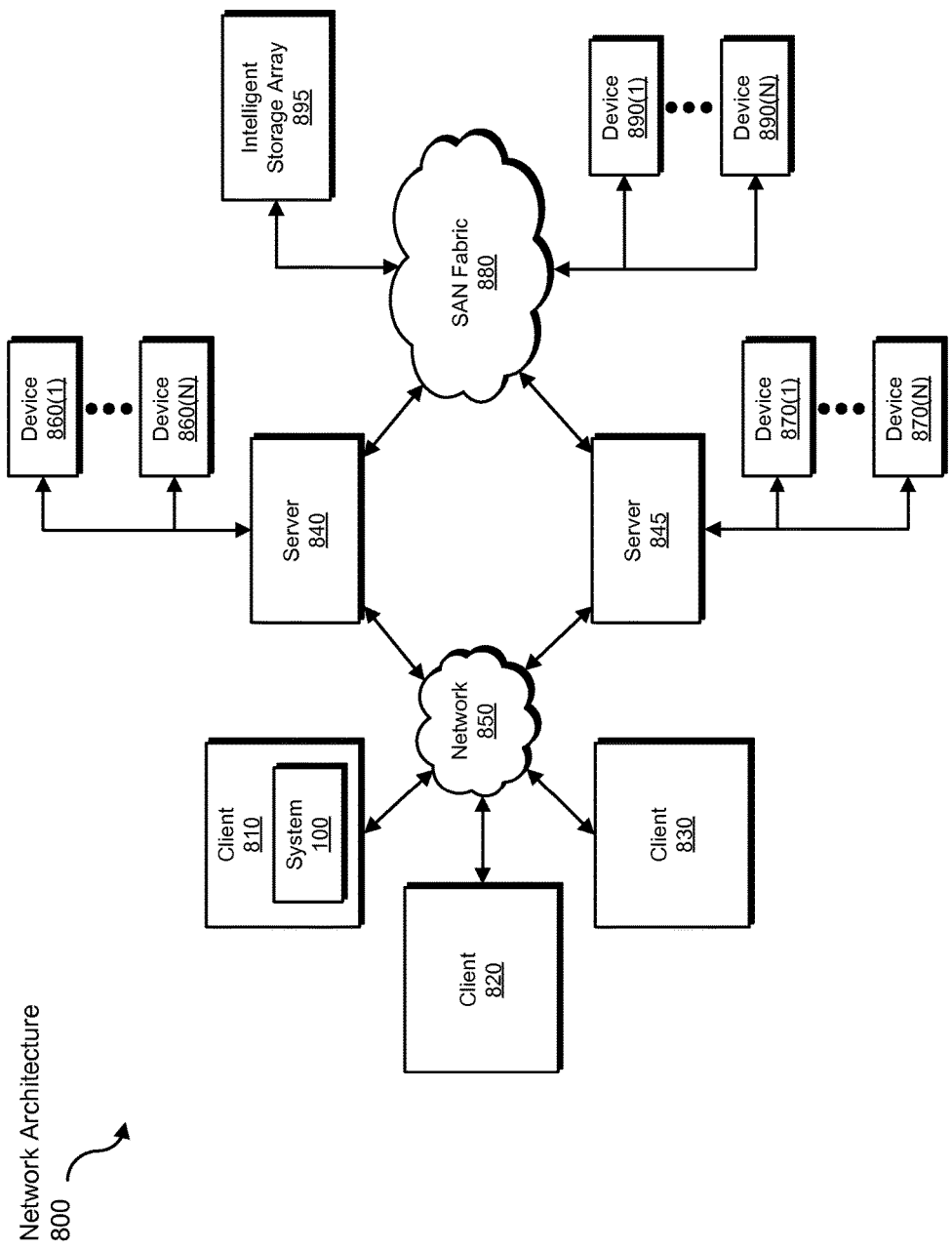
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for preventing tracking of mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a timestamp to be transformed, transform the timestamp, output a result of the transformation to a device with wireless communications capabilities, use the result of the transformation to rename an SSID, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing tracking of mobile devices, at least a portion of the method being performed by a computing device comprising at least one processor, the method comprising:
   identifying, from a first device comprising a mobile device with wireless networking capability, an initial service set identifier used by the first device as identification for a wireless network, wherein a second device comprising a wireless access point with wireless networking capability also uses the initial service set identifier as identification for the wireless network, thereby facilitating wireless networking involving the first device and the second device;
   determining, based at least in part on a time indicator at the first device, that the initial service set identifier is to be changed;
   generating, responsive to determining that the initial service set identifier is to be changed, a new service set identifier for use by the first device instead of the initial service set identifier, wherein the new service set identifier is generated with an identifier generation algorithm that is also used by the second device, such that both the first device and the second device generate the same new service set identifier; and
   replacing use of the initial service set identifier by the first device with use of the new service set identifier, such that both the first device and the second device use the new service set identifier, thereby continuing to facilitate wireless networking involving the first device and the second device while frustrating potential tracking attempts relying on the initial service set identifier,
   wherein:
      the wireless access point maintains backward compatibility with devices that do not support dynamically changing service set identifiers by simultaneously using both a static service set identifier and a dynamic service set identifier corresponding to the new service set identifier;
      the wireless access point uses the static service set identifier with home devices that are at a reduced risk of being attacked due to being immobile; and
      the wireless access point uses the dynamic service set identifier corresponding to the new service set identifier with mobile devices that are at a comparatively higher risk of being attacked than the home devices due to being mobile.

2. The computer-implemented method of claim 1, wherein the mobile device connects to the wireless network via the wireless access point.

3. The computer-implemented method of claim 2, wherein the wireless access point transmits a probe response advertising the new service set identifier, based on the new service set identifier corresponding to the wireless network.

4. The computer-implemented method of claim 2, wherein the wireless access point also uses the static service set identifier to facilitate a third device connecting to the wireless network, the wireless access point using the static service set identifier concurrently with the initial service set identifier when the initial service set identifier is in use and concurrently with the new service set identifier when the new service set identifier is in use.

5. The computer-implemented method of claim 2, wherein the wireless access point accepts both the initial service set identifier and the new service set identifier as corresponding to the wireless network for a predetermined period of time before accepting the new service set identifier and rejecting the initial service set identifier.

6. The computer-implemented method of claim 1, wherein the mobile device transmits a probe request that specifies the new service set identifier in an attempt to discover the wireless network, based on the new service set identifier corresponding to the wireless network.

7. The computer-implemented method of claim 1, wherein the identifier generation algorithm generates pseudorandom data.

8. The computer-implemented method of claim 1, wherein the mobile device replaces use of the initial service set identifier with use of the new service set identifier by altering a remembered service set identifier for automatically connecting to the wireless network to the new service set identifier.

9. The computer-implemented method of claim 1, wherein the identifier generation algorithm, on both the first device and the second device, uses the time indicator as input for deterministically generating the new service set identifier.

10. The computer-implemented method of claim 1, wherein the identifier generation algorithm, on both the first device and the second device, uses a shared secret as input for deterministically generating the new service set identifier.

11. The computer-implemented method of claim 1, wherein the initial service set identifier is publicly observable.

12. The computer-implemented method of claim 1, wherein replacing use of the initial service set identifier by the first device with use of the new service set identifier frustrates potential tracking attempts relying on a public observability of the initial service set identifier by preventing a subsequent observation of the initial service set identifier broadcast by the first device.

13. A system for preventing tracking of mobile devices, the system comprising:
an identification module, stored in memory, that identifies, from a first device comprising a mobile device with wireless networking capability, an initial service set identifier used by the first device as identification for a wireless network, wherein a second device comprising a wireless access point with wireless networking capability also uses the initial service set identifier as identification for the wireless network, thereby facilitating wireless networking involving the first device and the second device;
a determination module, stored in memory, that determines, based at least in part on a time indicator at the first device, that the initial service set identifier is to be changed;
a generation module, stored in memory, that generates, responsive to determining that the initial service set identifier is to be changed, a new service set identifier for use by the first device instead of the initial service set identifier, wherein the new service set identifier is generated with an identifier generation algorithm that is also used by the second device, such that both the first device and the second device generate the same new service set identifier;
a replacement module, stored in memory, that replaces use of the initial service set identifier by the first device with use of the new service set identifier, such that both the first device and the second device use the new service set identifier, thereby continuing to facilitate wireless networking involving the first device and the second device while frustrating potential tracking attempts relying on the initial service set identifier; and
at least one physical processor configured to execute the identification module, the determination module, the generation module, and the replacement module, wherein:
the wireless access point maintains backward compatibility with devices that do not support dynamically changing service set identifiers by simultaneously using both a static service set identifier and a dynamic service set identifier corresponding to the new service set identifier;
the wireless access point uses the static service set identifier with home devices that are at a reduced risk of being attacked due to being immobile; and
the wireless access point uses the dynamic service set identifier corresponding to the new service set identifier with mobile devices that are at a comparatively higher risk of being attacked than the home devices due to being mobile.

14. The system of claim 13, wherein the mobile device connects to the wireless network via the wireless access point.

15. The system of claim 14, wherein the wireless access point transmits a probe response advertising the new service set identifier, based on the new service set identifier corresponding to the wireless network.

16. The system of claim 14, wherein the wireless access point also uses the static service set identifier to facilitate a third device connecting to the wireless network, the wireless access point using the static service set identifier concurrently with the initial service set identifier when the initial service set identifier is in use and concurrently with the new service set identifier when the new service set identifier is in use.

17. The system of claim 14, wherein the wireless access point accepts both the initial service set identifier and the new service set identifier as corresponding to the wireless network for a predetermined period of time before accepting the new service set identifier and rejecting the initial service set identifier.

18. A non-transitory computer-readable medium comprising one or more computer-readable instructions that, when executed by at least one processor of a computing device, cause the computing device to:
identify, from a first device comprising a mobile device with wireless networking capability, an initial service set identifier used by the first device as identification for a wireless network, wherein a second device comprising a wireless access point with wireless networking capability also uses the initial service set identifier as identification for the wireless network, thereby facilitating wireless networking involving the first device and the second device;
determine, based at least in part on a time indicator at the first device, that the initial service set identifier is to be changed;
generate, responsive to determining that the initial service set identifier is to be changed, a new service set identifier for use by the first device instead of the initial service set identifier, wherein the new service set identifier is generated with an identifier generation algorithm that is also used by the second device, such that both the first device and the second device generate the same new service set identifier;
replace use of the initial service set identifier by the first device with use of the new service set identifier, such that both the first device and the second device use the new service set identifier, thereby continuing to facilitate wireless networking involving the first device and the second device while frustrating potential tracking attempts relying on the initial service set identifier, wherein:
the wireless access point maintains backward compatibility with devices that do not support dynamically changing service set identifiers by simultaneously using both a static service set identifier and a dynamic service set identifier corresponding to the new service set identifier;
the wireless access point uses the static service set identifier with home devices that are at a reduced risk of being attacked due to being immobile; and
the wireless access point uses the dynamic service set identifier corresponding to the new service set identifier with mobile devices that are at a comparatively higher risk of being attacked than the home devices due to being mobile.

* * * * *